US010511846B1

(12) United States Patent
Chen et al.

(10) Patent No.: US 10,511,846 B1
(45) Date of Patent: Dec. 17, 2019

(54) REAL-TIME ADAPTIVE VIDEO DENOISER WITH MOVING OBJECT DETECTION

(71) Applicant: GOOGLE INC., Mountain View, CA (US)

(72) Inventors: Jing Chen, Fremont, CA (US); Marco Paniconi, Campbell, CA (US); Michael Horowitz, Manhattan Beach, CA (US)

(73) Assignee: Google LLC, Mountain View, CA (US)

( * ) Notice: Subject to any disclaimer, the term of this patent is extended or adjusted under 35 U.S.C. 154(b) by 390 days.

(21) Appl. No.: 15/254,723

(22) Filed: Sep. 1, 2016

(51) Int. Cl.
| | |
|---|---|
| *H04N 19/117* | (2014.01) |
| *H04N 19/137* | (2014.01) |
| *H04N 19/36* | (2014.01) |
| *H04L 12/801* | (2013.01) |
| *H04N 19/14* | (2014.01) |
| *H04N 19/176* | (2014.01) |
| *H04N 19/172* | (2014.01) |
| *H04N 19/182* | (2014.01) |

(52) U.S. Cl.
CPC ............ *H04N 19/36* (2014.11); *H04L 47/29* (2013.01); *H04N 19/117* (2014.11); *H04N 19/137* (2014.11); *H04N 19/14* (2014.11); *H04N 19/172* (2014.11); *H04N 19/176* (2014.11); *H04N 19/182* (2014.11)

(58) Field of Classification Search
CPC .......................... H04N 19/117; H04N 19/137
USPC ..................................... 375/240.02
See application file for complete search history.

(56) References Cited

U.S. PATENT DOCUMENTS

| | | | | |
|---|---|---|---|---|
| 6,130,912 A | * | 10/2000 | Chang ................. | H04N 5/145 348/E5.066 |
| 6,285,710 B1 | * | 9/2001 | Hurst, Jr. ............. | H04N 5/21 348/607 |
| 6,614,847 B1 | * | 9/2003 | Das .................... | H04N 19/537 375/240.15 |
| 7,551,232 B2 | * | 6/2009 | Winger ................. | H04N 5/21 348/607 |
| 7,920,628 B2 | * | 4/2011 | Kojokaro ............. | H04N 19/139 375/240.16 |
| 8,098,256 B2 | * | 1/2012 | Zipnick ................ | G06T 5/50 345/502 |
| 8,149,336 B2 | * | 4/2012 | Mohanty ............. | G06T 5/50 348/607 |
| 8,254,438 B2 | * | 8/2012 | Davis .................. | H04N 17/004 375/240 |
| 8,280,182 B2 | * | 10/2012 | Lee ..................... | G06T 7/254 382/236 |
| 8,311,129 B2 | * | 11/2012 | Jenkins ............... | H04N 7/141 375/240.12 |
| 8,385,425 B2 | * | 2/2013 | Crinon ................. | H04N 5/21 375/240.24 |

(Continued)

*Primary Examiner* — Jeremiah C Hallenbeck-Huber
(74) *Attorney, Agent, or Firm* — IP Spring

(57) ABSTRACT

A method and apparatus for adaptive denoising of source video in a video conference application is provided. Source video frames received from a video capture device are divided into a plurality of 16×16 blocks. For each source block, a moving object detection process and a noise estimation process are performed. Then temporal denoising is adaptively applied to the blocks of the source frame based on the noise estimation and moving object detection. The adaptively filtered blocks are provided to an output frame and forwarded to a coding module for encoding.

29 Claims, 10 Drawing Sheets

(56) References Cited

U.S. PATENT DOCUMENTS

| | | | | |
|---|---|---|---|---|
| 8,447,069 B2* | 5/2013 | Huang | ............... | G06T 7/254 |
| | | | | 382/103 |
| 8,629,937 B1* | 1/2014 | Zhou | ............... | H04N 7/014 |
| | | | | 348/448 |
| 9,462,163 B2* | 10/2016 | Jain | ............... | G06T 5/002 |
| 9,633,416 B1* | 4/2017 | Lee | ............... | G06T 5/002 |
| 2006/0198441 A1* | 9/2006 | Chi | ............... | G08B 13/19602 |
| | | | | 375/240.16 |
| 2008/0134094 A1* | 6/2008 | Samadani | ............... | G06T 3/0012 |
| | | | | 715/838 |
| 2009/0153739 A1* | 6/2009 | Hong | ............... | H04N 5/144 |
| | | | | 348/620 |
| 2014/0105498 A1* | 4/2014 | Sethuraman | ............... | G06T 7/20 |
| | | | | 382/180 |
| 2014/0193070 A1* | 7/2014 | Lai | ............... | G06T 7/0002 |
| | | | | 382/168 |

* cited by examiner

REAL-TIME ADAPTIVE VIDEO DENOISER WITH MOVING OBJECT DETECTION

BACKGROUND

Video conferencing with mobile devices is becoming more and more commonplace. However, video captured with a mobile device is often noisy due to the space/size constraints of the video capturing devices on the mobile device.

The video capturing device, e.g., camera, charge-coupled device (CCD), CMOS image sensor, and the like, provided in mobile devices have much smaller image sensors than stand-alone cameras. As a result, when video is captured/recorded on a mobile device, especially in low-light conditions, the resulting images/videos are often noisy.

Although there are various known processes for reducing noise from captured video footage, many of these known video noise reduction filters (VNRs) are not only processor intensive but are not capable of being implemented in real-time interactive applications, such as video conferencing, where low-delay, for example, 200 ms or less, is an essential requirement. Furthermore, many conventional real-time VNR algorithms are codec specific.

Many of the conventional VNRs that are suitable for real-time interactive applications are often embedded in the codec and/or make use of encoding data, for example, motion vectors, computed as part of the coding process. As a result these conventional VNRs are considered internal VNRs. An alternative to conventional internal VNRs is to parse the bitstream of the codec and use the parsed information in an external denoising component. However, this alternative is not universally applicable and depends on the codec (via the parsing), also the parsed information from the bitstream can only be extracted from the previous frame and hence introduces some delay and/or visual artifacts.

Video conferencing platforms/applications may be used in may products, such as Google Hangouts™, Facebook Messenger™, Amazon Mayday™ and Snapchat™. These platforms/application may support several video codecs, for example, VP8, VP9, and H.264. Although some of the standardized codecs, such as, VP8 and VP9, may have internal video noise filters (VNRs), which are embedded in the encoder and use information collected from the encoder, such as motion vectors, hardware codecs are emerging, which normally do not have video noise filters.

Accordingly, a need exists for a codec independent video noise reduction filter (VNR) capable of meeting the processing requirements of video conferencing applications on mobile devices.

SUMMARY

This specification describes technologies relating to temporal noise filtering in general, and specifically to methods and systems for adaptive denoising of source video in a video conferencing application where in the denoising process is independent of the utilized codec and utilizes moving object detection.

In general, one aspect of the subject matter described in this specification can be embodied in a method or source device for adaptive noise filtering of source video prior to encoding in a video conferencing system, the method comprising: receiving source frames from a video capturing device; preprocessing the received source frames by removing noise from one or more blocks of a source frame; encoding the preprocessed source frames; and transmitting, over a network, the encoded frames to at least one endpoint.

According to an embodiment, removing noise from one or more blocks of a source frame comprises: dividing the source frame into a plurality of blocks, each block having N×N pixels, N being an integer; and generating a preprocessed source frame by adaptively applying a block-based temporal denoising filter to the plurality of source blocks, where a preprocessed source frame includes at least one filtered block and at least one source block.

According to other embodiments adaptively applying a block-based temporal denoising filter to the plurality of source blocks, comprises: for each of the plurality of source blocks, determining whether an absolute difference between a sum of block pixels in a corresponding denoised block at time t−1 minus a sum of block pixels in a source block at time t satisfies a difference threshold; and in response to a determination that the difference threshold is satisfied identifying the source block as moving, and otherwise identifying the source block as static; and for each of the plurality of source blocks, if the source blocks is identified as moving, coping the source block into the preprocessed frame and if the source block is identified as static, copying a noise filtered version of the source block into the preprocessed frame.

According to other embodiments the adaptive noise filtering method includes performing moving object detection to determine which of the plurality of source blocks are moving blocks. The moving object detection may be variance-based. The variance-based moving object detection comprises: for each of the plurality of source blocks, determining a variance between a corresponding noise filtered block at time t and a corresponding preprocessed source frame block at time t−1; if the variance satisfies a predefined variance threshold then marking the source block as a moving object edge block, otherwise marking the source block as static; identifying moving objects with the source frame by filling in the moving object edge blocks.

According to further embodiments, detecting moving objects with the source frame may include deriving density values for the rows and columns of the source frame by accumulating the number of moving blocks for each row and column in the source frame; and generating a rectangle of moving blocks around the blocks previously marked as moving object edge blocks. According to a further aspect, performing false object detection may be performed by, for each block marked as moving object block, determining whether there exists a moving object block between it and two adjacent frame borders, and in response to a determination that no moving block exists, marking the block as static.

According to yet further embodiments, aspects may use dynamic programming to determine, for each block marked as a moving object block, whether there exists a moving object block between it and two adjacent frame borders.

According to other embodiments, aspects may perform a noise level estimation for the source frames; and adapt the block-based temporal denoising filter based on the estimate noise level of a source frame.

In at least some aspects, the noise level estimation is binary and uses a variance metric to distinguish high and low noise levels.

According to a further embodiment, the noise level estimation may include calculating a noise value using $$\text{noise value} = \frac{\sum_{i=0}^{M-1} \text{weight} * \text{variance}(s_{t,i}, p_{t-1,i})}{M},$$

$$\text{where weight} = \frac{16}{\text{average luma of } s_{t,i}}$$

and M is the number of consecutive static blocks; temporally averaging the calculated noise value on a fixed running window of a predetermined number of frames; determining, for a current frame, whether the average noise level satisfies a noise threshold; and in response to a determination that the average noise level satisfies the noise threshold setting the noise level as high and otherwise setting the noise level as low.

According to at least some aspects, more weight is given to darker blocks.

According to a yet further embodiment, adapting the block-based temporal denoising filter based on the estimate noise level of a source frame includes: in response to a low noise level estimation for a source frame, noise filtering is decreased by lowering the difference threshold; and in response to a high noise level estimation for a source frame, noise filtering is increased by increasing the difference threshold.

According to a still further embodiment, adapting the block-based temporal denoising filter based on the estimate noise level of a source frame further includes: adapting the moving object detection based on noise level and block position.

In at least some aspects, adapting the moving object detection based on noise level and block position, may include: in response to a low noise level estimation for a source frame, lowering the variance threshold; and in response to a high noise level estimation for a source frame, lowering the variance threshold for blocks in the center of the source frame; and increasing the variance threshold for blocks on the source frame border.

According to another embodiment, a source device is disclosed for adaptive noise filtering of source video prior to encoding in a video conferencing system, the source device including: a video capture device that captures video source frames; an external video noise filter, configured to receive source frames from the video capturing device; preprocess the received source frames by removing noise from one or more blocks of a source frame; a video codec configured to receive the preprocessed source frame; generate an encoded video bitstream, by encoding the preprocessed source frames; and a processor configured to transmit, over a network, the encoded video bistream to at least one endpoint.

According to a yet further embodiment, removing noise from one or more blocks of a source frame includes: dividing the source frame into a plurality of blocks, each block having N×N pixels, N being an integer; and generating a preprocessed source frame by adaptively applying a block-based temporal denoising filter to the plurality of source blocks, where a preprocessed source frame includes at least one filtered block and at least one source block.

In at least some aspects, adaptively applying a block-based temporal denoising filter to the plurality of source blocks, includes: for each of the plurality of source blocks, determining whether an absolute difference between a sum of block pixels in a corresponding denoised block at time t−1 minus a sum of block pixels in a source block at time t satisfies a difference threshold; and in response to a determination that the difference threshold is satisfied identifying the source block as moving, and otherwise identifying the source block as static; and for each of the plurality of source blocks, if the source block is identified as moving, coping the source block into the preprocessed frame and if the source block is identified as static, copying a noise filtered version of the source block into the preprocessed frame.

In at least some aspects, the external video noise filter is further configured to perform moving object detection to determine which the of the plurality of source blocks are moving blocks.

In at least some embodiments, the moving object detection is variance based. Moreover, variance-based moving object detection may include: for each of the plurality of source blocks, determining a variance between a corresponding noise filtered block at time t and a corresponding preprocessed source frame block at time t−1; if the variance satisfies a predefined variance threshold then marking the source block as a moving object edge block, otherwise marking the source block as static; identifying moving objects with the source frame by filling in the moving object edge blocks.

In another embodiment, detecting moving objects with the source frame includes: deriving density values for the rows and columns of the source frame by accumulating the number of moving blocks for each row and column in the source frame; generating a rectangle of moving blocks around the blocks previously marked as moving object edge blocks.

In a yet further embodiment, the external video noise filter is further configured to perform false object detection by, for each block marked as moving object block, determining whether there exists a moving object block between it and two adjacent frame borders, and in response to a determination that no moving block exists, marking the block as static.

In a still further embodiment, the external video noise filter is further configured to: use dynamic programming to determine, for each block marked as a moving object block, whether there exists a moving object block between it and two adjacent frame borders.

In a yet still further embodiment, the external video noise filter is further configured to: perform a noise level estimation for the source frames; and adapt the block-based temporal denoising filter based on the estimate noise level of a source frame.

In a further aspect, the noise level estimation is binary and uses a variance metric to distinguish high and low noise levels. Moreover, the noise level estimation may include: calculating a noise value using $$\text{noise value} = \frac{\sum_{i=0}^{M-1} \text{weight} * \text{variance}(s_{t,i}, p_{t-1,i})}{M},$$

$$\text{where weight} = \frac{16}{\text{average luma of } s_{t,i}}$$

and M is the number of consecutive static blocks; temporally averaging the calculated noise value on a fixed running window of a predetermined number of frames; determining, for a current frame, whether the average noise level satisfies a noise threshold; and in response to a determination that the average noise level satisfies the noise threshold setting the noise level as high and otherwise setting the noise level as low.

In a still further embodiment, more weight is given to darker blocks.

In a further embodiment, adapting the block-based temporal denoising filter based on the estimate noise level of a source frame includes: in response to a low noise level estimation for a source frame, noise filtering is decreased by lowering the difference threshold; and in response to a high noise level estimation for a source frame, noise filtering is increased by increasing the difference threshold.

In a yet further embodiment, adapting the block-based temporal denoising filter based on the estimate noise level of a source frame further includes: adapting the moving object detection based on noise level and block position.

In a still further embodiment, adapting the moving object detection based on noise level and block position includes: in response to a low noise level estimation for a source frame, lowering the variance threshold; and in response to a high noise level estimation for a source frame, lowering the variance threshold for blocks in the center of the source frame; and increasing the variance threshold for blocks on the source frame border.

The details of one or more embodiments are set forth in the accompanying drawings which are given by way of illustration only, and the description below. Other features, aspects, and advantages of the disclosed embodiments will become apparent from the description, the drawings, and the claims. Like reference numbers and designations in the various drawings indicate like elements.

DETAILED DESCRIPTION

The disclosed embodiments provide systems and methods for adaptive video noise filtering of source video prior to encoding, in general, and specifically to an external adaptive video noise filtering process, with moving object detection, prior to encoding.

According to exemplary embodiments, the moving object detection (MOD) based external video noise reduction filter (VNR) is designed to be suitable for interactive, i.e., real-time, video conferencing applications, where low-delay, for example, 200 ms or less, is an essential requirement. The external VNR improves video quality when the source video is noisy due to hardware constraints, for example, mobile devices which have limited power and processing capabilities in addition to cameras which typically introduce noise to the captured signal.

Figure 1:
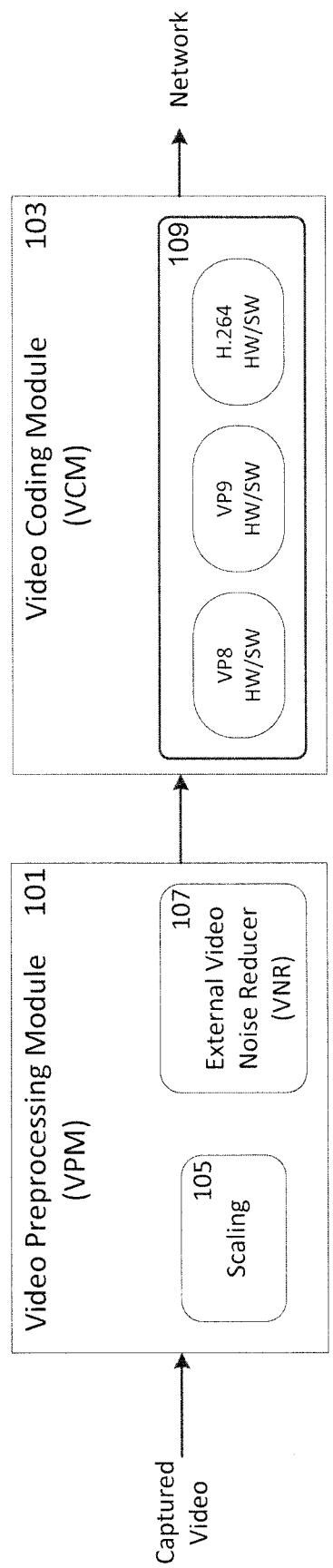
FIG. 1 is a block diagram illustrating an example video conferencing data flow at the video capturing side.

FIG. 1 is a block diagram illustrating an example video conferencing data flow at the video capturing side, also referred to as the source, incorporating an external video noise filter 107 according to exemplary embodiments. As shown in FIG. 1, video captured from a video capture device, for example, mobile camera, charge-coupled device (CCD), CMOS image sensor, and the like, is preprocessed in the video preprocessing module 101, encoded in the video coding module 103, and then transmitted over the network to at least one end point (not shown). The video coding module 103 encodes the video frames received from the video preprocessing module 101 and generates a video bitstream using any suitable/supported codec 109. The video bitstream is provided to the network for transmission to one or more destination devices, also referred to an end points (not shown) using conventional methodologies. During the encoding process, the applied codec 109 may also include an internal noise filter which filters noise from the video signal. FIG. 1 shows three supported codec, VP8, VP9, and H.264; however additional or alternative codecs may be utilized because the exemplary video noise reducer/filter 107 is external, i.e., independent to the codec utilized for encoding the source video.

Figure 2:
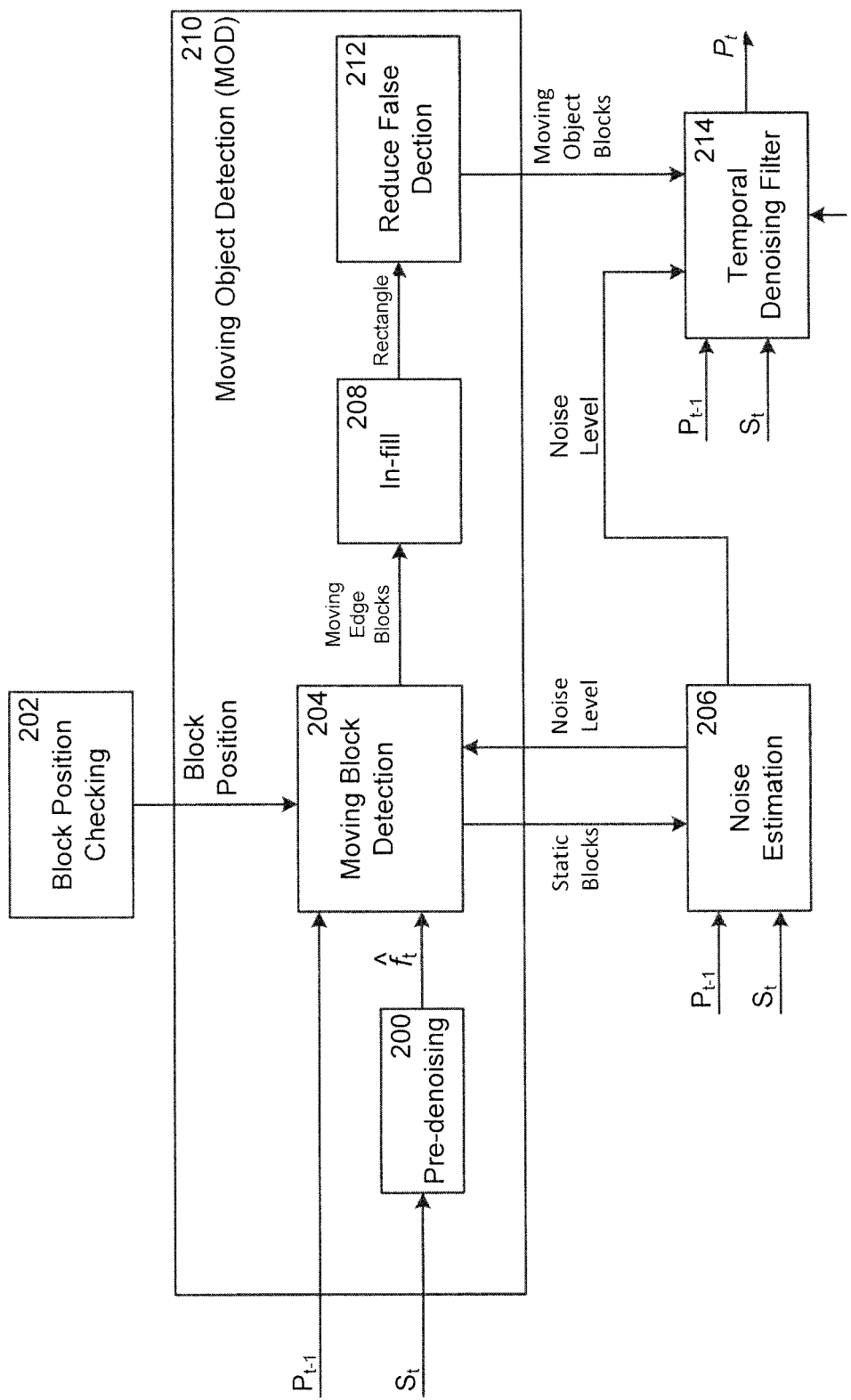
FIG. 2 is a block diagram illustrating an exemplary external noise filter according to an embodiment.

As shown in FIG. 2, according to an example embodiment, the external VNR 107 uses a block-based temporal motion-compensated filter 214 which may be adapted based on the output of the noise estimator 206 and the moving object detector 210. Unlike conventional internal block-based temporal motion-compensated filters, the external temporal denoising filter 214 does not motion compensate the blocks. This is due to the fact that the temporal noise filter 214 does not compute or have access to motion vectors. Instead, the temporal denoising filter 214 is adapted utilizing information from the moving object detection process 210 to identify moving object blocks and noise level information from the noise estimator 206. The adaptation is discussed in more detail below with respect to FIGS. 3C, 4 and 6. The moving object detector 210 includes a pre-noise filter 200, a moving object edge detector 204, a moving object block filler 208; and a false detection reducer 212. The moving object detector is discussed in more detail below with respect to FIGS. 4 and 5A-5C.

Figure 3A:
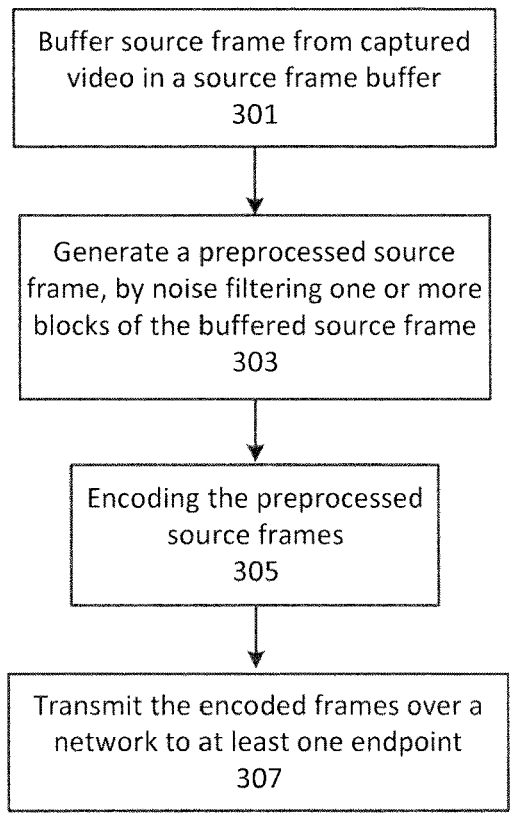
FIG. 3A-C are a block diagrams illustrating an exemplary external noise filtering process according to example embodiments.

Referring to FIG. 3A, according to an example embodiment, the source frames received from a video capture device, for example, mobile camera, charge-coupled device (CCD), CMOS image sensor, and the like, are buffered in a source frame buffer (step 301). A preprocessed source frame is generated (step 303) by noise filtering one or more blocks of the buffered source frame. The preprocessed source frames are encoded (step 305) and then transmitted over the network to at least one end point (step 307).

Figure 3B:
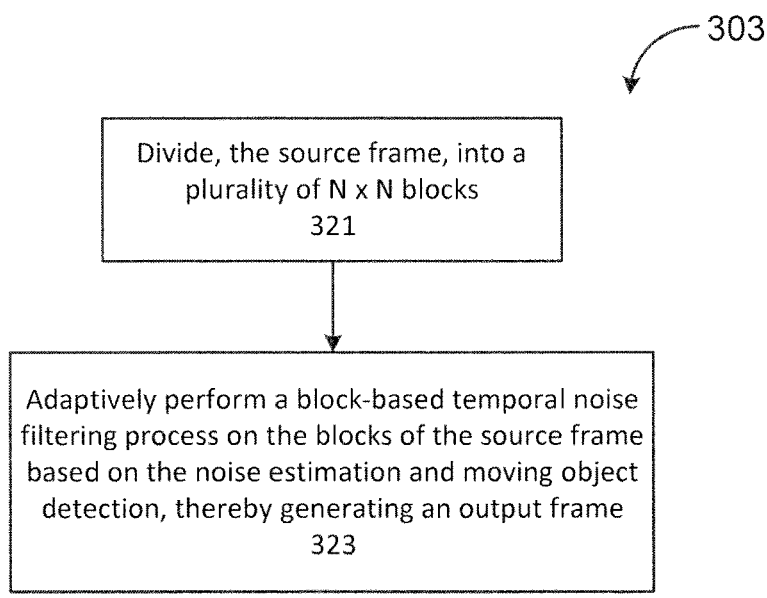

Generation of the preprocessed source frame (step 301) includes several steps. As shown in FIG. 3B, according to an example embodiment, the preprocessed sour frame is generated by dividing (step 321) the source frame into a plurality of N×N blocks. Then for each of the plurality of source blocks performing a block-based temporal noise filtering process based on noise estimation and moving object detection (step 323).

Referring back to step 301, the source frame is divided into L blocks, each block having N×N pixels. Both L and N are integers and L equals the total number of pixels in the source frame divided by $N^2$. The number N of pixels in each block, according to an exemplary embodiment is determined using a conventional algorithm which factors in the resolution of the raw video frame into the determination of N such that the N used for high definition video is larger than the N used for standard definition video. For the purposes of this disclosure, the buffered video frame may be divided into a plurality, L, of 16×16 blocks.

Figure 3C:
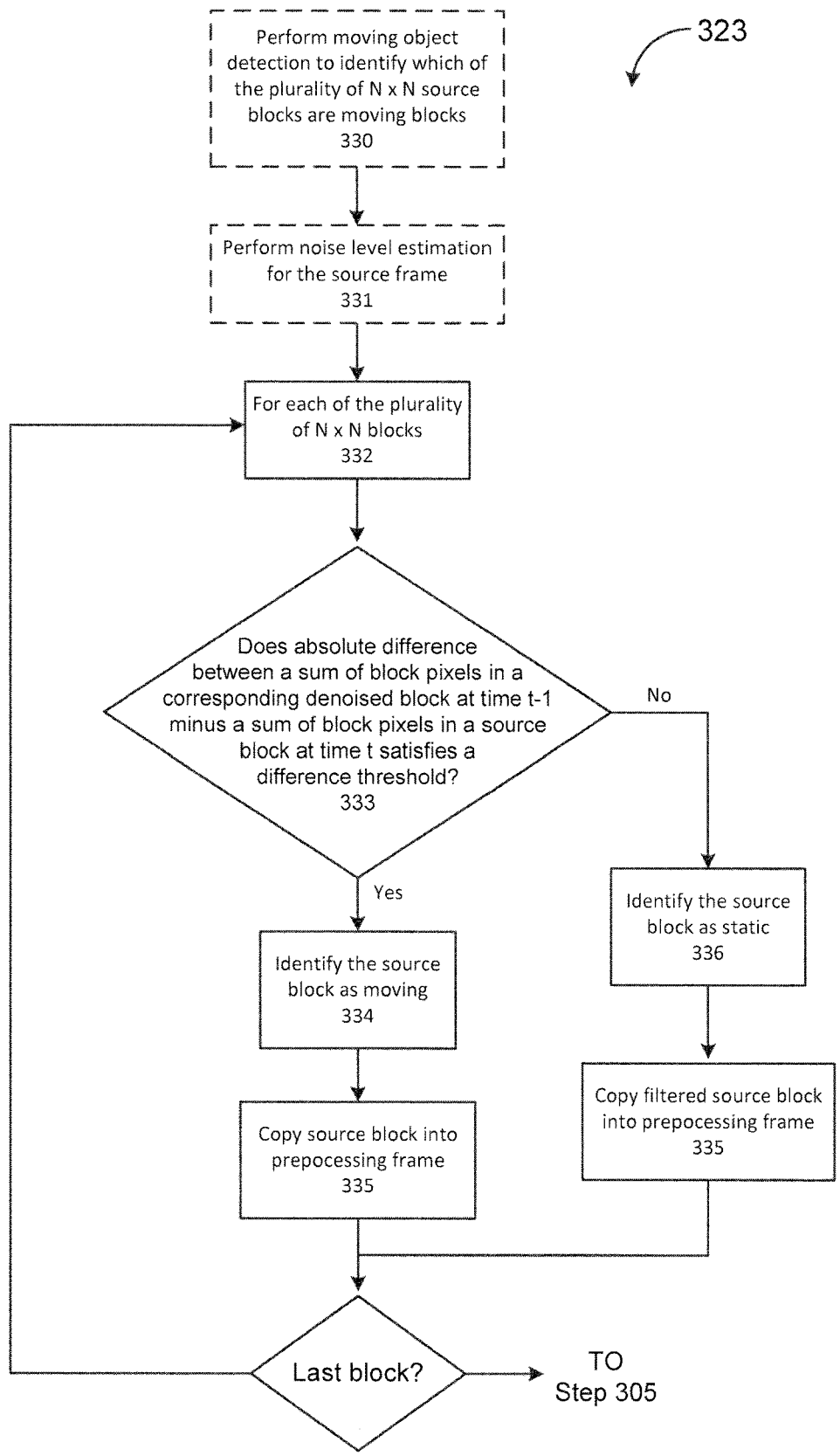
Figure 6:
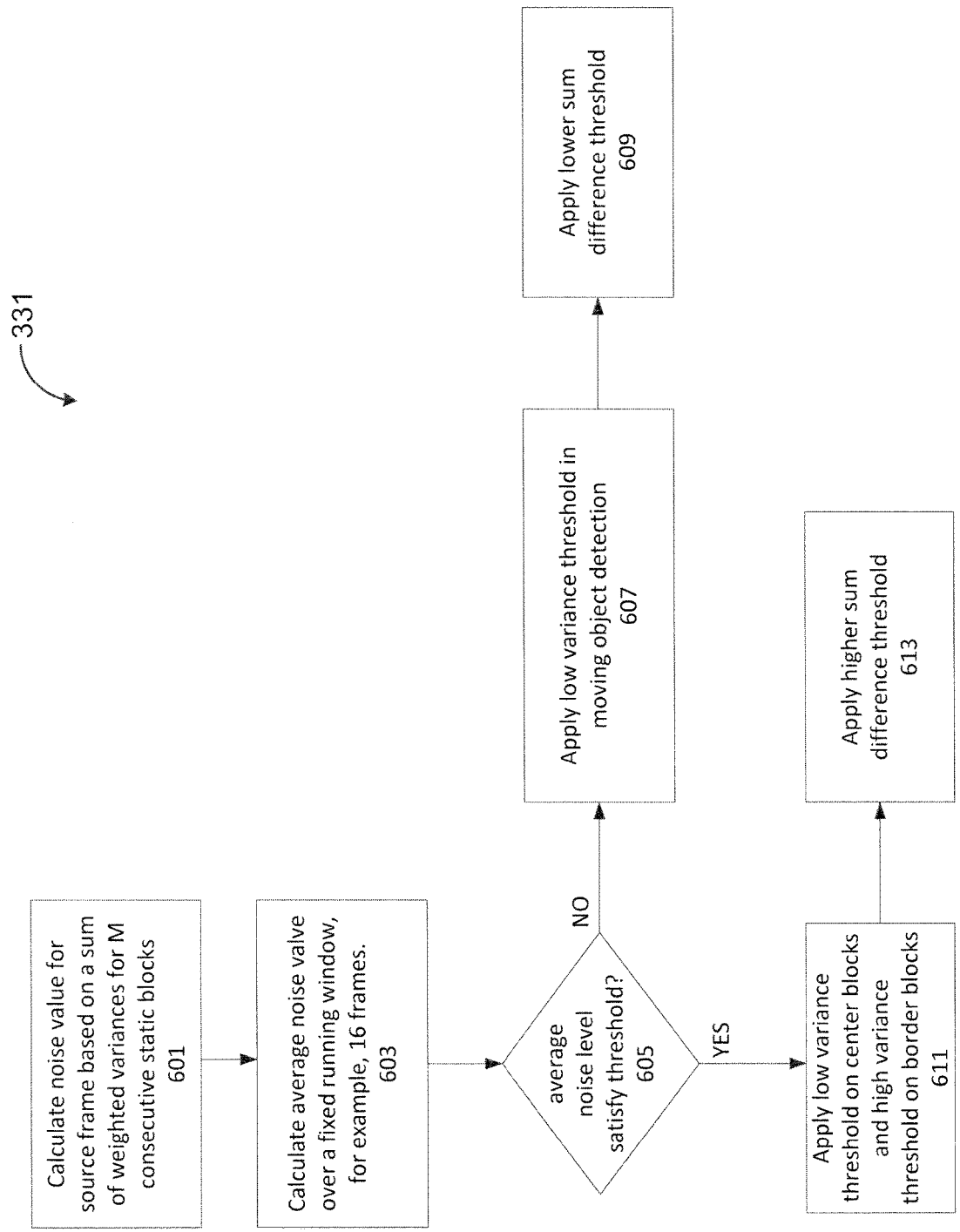
FIG. 6 is a block diagram illustrating an exemplary adaptive algorithm based on noise level and block position according to an embodiment.

According to an example embodiment, the block-based temporal noise filtering process (step 323) by be adaptively performed as shown in FIG. 3C. Excluding the optional steps 330 and 331, the process begins at step 332, where for each 16×16 block the absolute value of the difference between the sum of the pixels luma values, i.e., the Y component when using YUV420 format or other YUV formats, in the denoised block at time t−1 minus the sum of the pixels in the source block at time t, |sumdiff$_t$| in Equation (1) below, is compared to a difference threshold, kSumDiffThreshold (step 333). If the sum difference (|sumdiff$_t$|) satisfies a predefined criteria (yes path out of 333), for example, is greater than the difference threshold (kSumDiffThreshold), the source block is identified as a moving block (step 334) and the source block, S$_t$, is copied into the preprocessed frame buffer for encoding (step 335). In other words, no noise filtering for is performed on the moving block. Otherwise (no path out of 333), the source block is identified as a static block (step 336) and a noise filtered version of the block is copied into the preprocessed frame buffer for encoding (step 337). Consequently the filtering process can be adapted to filter more blocks by setting/increasing the value of the difference threshold, kSumDiffThreshold, to a high/higher value. Adaptation is accordingly to an exemplary embodiment is shown in FIG. 6.

$$|sumdiff_t| = \left| \sum_{i=0}^{N-1} p_{t-1}(i) - \sum_{i=0}^{N-1} s_t(i) \right| \qquad \text{Eq. (1)}$$

where N is the number of pixels in a block (e.g., 256), $p_{t-1}(i)$ is the $i^{th}$ of the pixel luma, also referred to as brightness, of a noise filtered block at time t−1, and $s_t(i)$ is the $i^{th}$ sample the source block at time t.

The above sum difference filtering technique works well in noisy regions where no objects are in motion; however it has difficulty in low-detail moving areas, such as a forehead, because the sum difference can remain below the difference threshold despite there being movement, causing the noise filter to be inappropriately applied, resulting in unnatural blocking and smoothing. Therefore, according to exemplary embodiments, the block-based temporal noise filtering process (step 323) may include performing moving object detection to identify which of the plurality of N×N source blocks are moving blocks (Step 330) and/or performing noise level estimation to adapt the filtering thresholds (step 331).

Because the video noise filter 107 is external to the encoder, it does not have access to motion vector information. Furthermore, in order to meet the low delay requirements of real-time video conferencing application, the video noise filter cannot compute motion vectors. Therefore, the moving object detection process relies on other metrics, for example, sum difference, absolute difference, variance and the like to detect motion. The absolute difference, absdiff$_t$(i), is the difference between the $i^{th}$ pixel in the source block at time t and the $i^{th}$ pixel in the filtered a block at time t−1 as shown in Equation (2) below.

$$absdiff_t = |s_t(i) - p_{t-1}(i)| \qquad \text{Eq. (2)}$$

where $s_t(i)$ is the $i^{th}$ pixel at time t, $p_{t-1}$ is the $i^{th}$ pixel in the noise filtered block at time t−1. The variance of two blocks at time t and t−1, denoted $b_t$ and $b_{t-1}$ respectively, is defined as:

$$\text{variance}(b_t, b_{t-1}) = \sum_{i=0}^{N-1} (d(i) - \bar{d})^2 \text{ where } d(i) = b_{t-1}(i) \text{ and } \bar{d} = \frac{\sum_{i=0}^{N-1} d(i)}{N}. \qquad \text{Eq. (3)}$$

Figure 4:
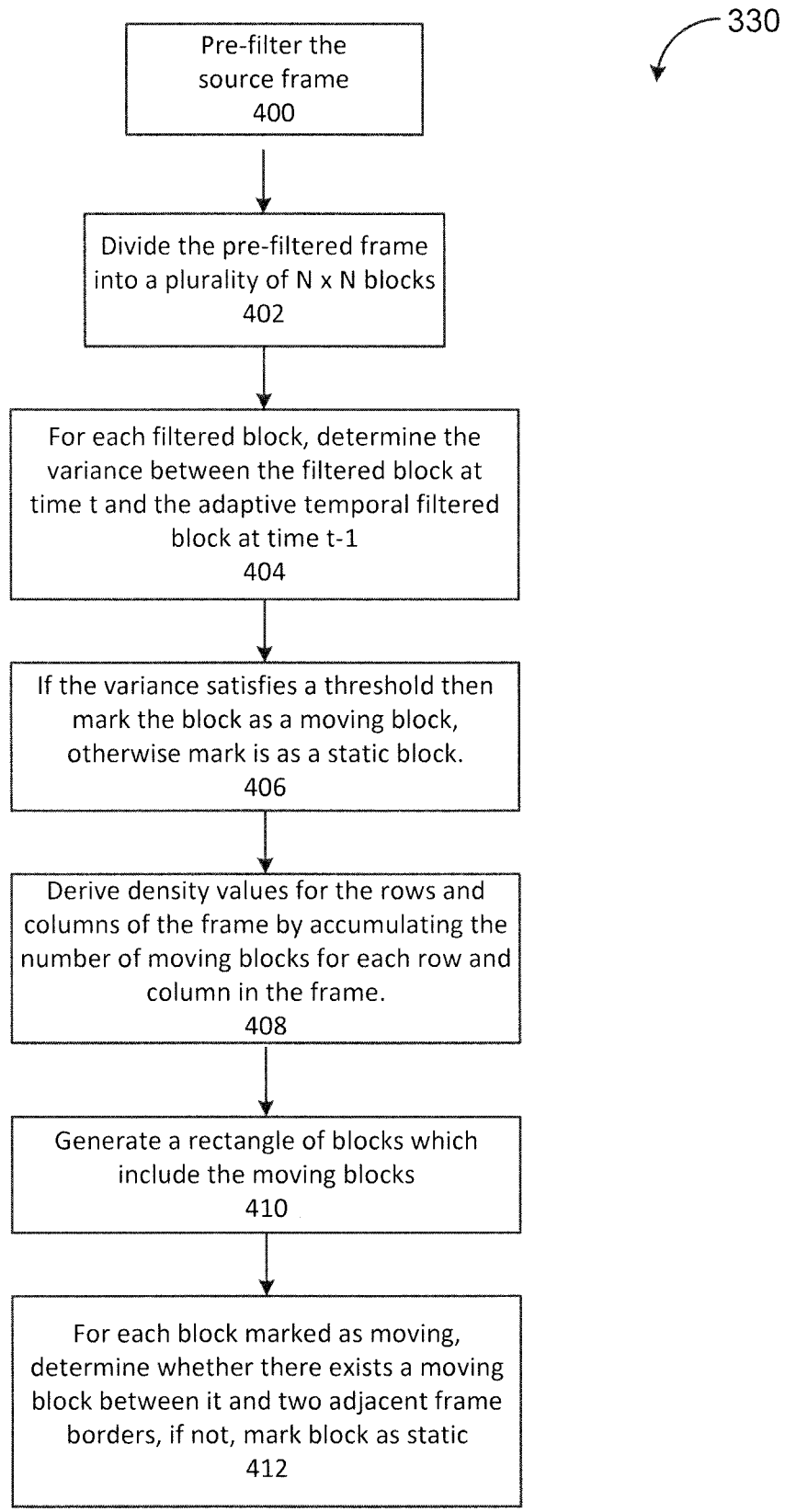
FIG. 4 is a block diagram illustrating an exemplary moving object detection process according to an embodiment.

According to an example embodiment, the moving object detection process 330 utilizes the variance metric to detect motion that is largely camera independent. As shown in FIG. 4, the process begins by pre-filtering each block in the source frame (step 400), producing a pre-filtered frame, $\widehat{f_t}$. The pre-filtered frame represents the filtered source block at time t. The pre-filtered frame, $\widehat{f_t}$, differs from preprocessed frame $p_t$ which is provided to the encode (step 305) in that in $\widehat{f_t}$ every block is filtered whereas in $p_t$ some blocks may be filtered and others not filtered. The pre-filtered frame is divided into a plurality of N×N blocks (step 402). Then, for each pre-filtered block the variance, variance($\widehat{f_t}$, $p_{t-1}$) between the pre-filtered block at time t and the preprocessed frame block at time t−1 is determined (step 404). If the variance satisfies a threshold then the source block is marked as a moving object edge block and otherwise the source block is mark as a static block. For example, the following algorithm may be used:

variance($\widehat{f_t}$, $p_{t-1}$)≥var_thresold? marked as moving block: marked as static block   Eq. (4)

Referring back to FIG. 3C, steps 335 and 336, only source blocks marked as static are noise filtered. Therefore, the moving object detection process 330 that improves the effectiveness of video noise filtering process 323 without requiring motion vector information from the encoding process. This allows the noise filtering process 323 to not only be codec independent but applicable in device with lower processing capabilities. In addition, the moving object detection process 330 allows for application of very strong filtering of noisy background regions while mitigating the risk of misapplying a strong filter to a moving object, which would likely introduce objectionable artifacts.

Returning back to the moving object detection process 330, because the above variance based process (steps 402-406) typically detects the blocks which contain a moving edge, but does not identify the non-edge containing blocks as moving which, for flat moving objects, such as a forehead, or moving door, can provide undesirable results. The moving object detection process fills in the blocks surrounded by the moving-edge-detected blocks to prevent generating artifacts on the moving flat blocks. The fill in process 208 derives density values for the rows and columns of the frame by accumulating the number of moving blocks for each row and column (step 408), and then generates a rectangle of blocks which include the moving edge blocks (step 410).

Figure 5A:
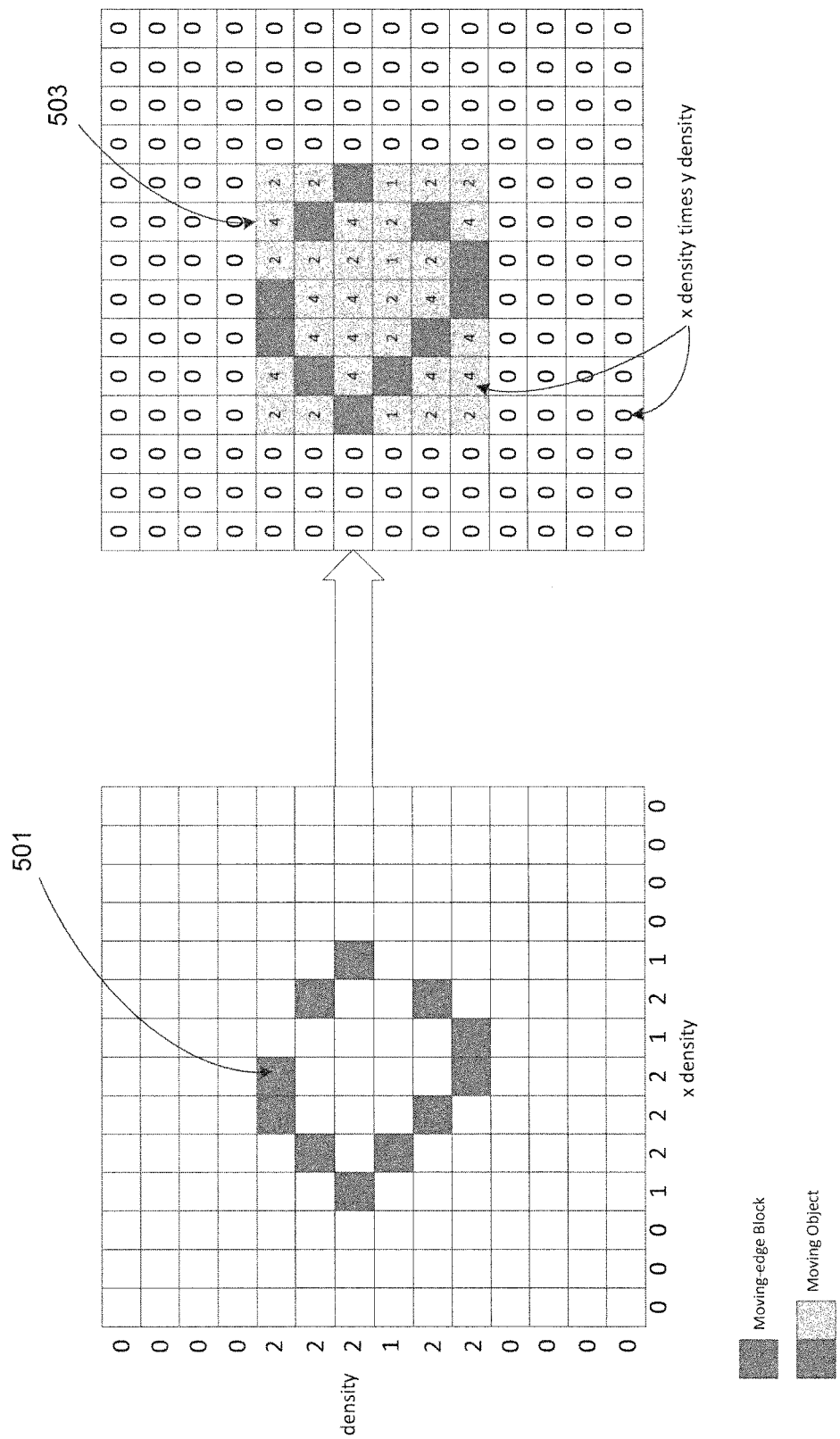
FIG. 5A illustrates detection of moving object edge blocks and fill in according to an embodiment.
Figure 5B:
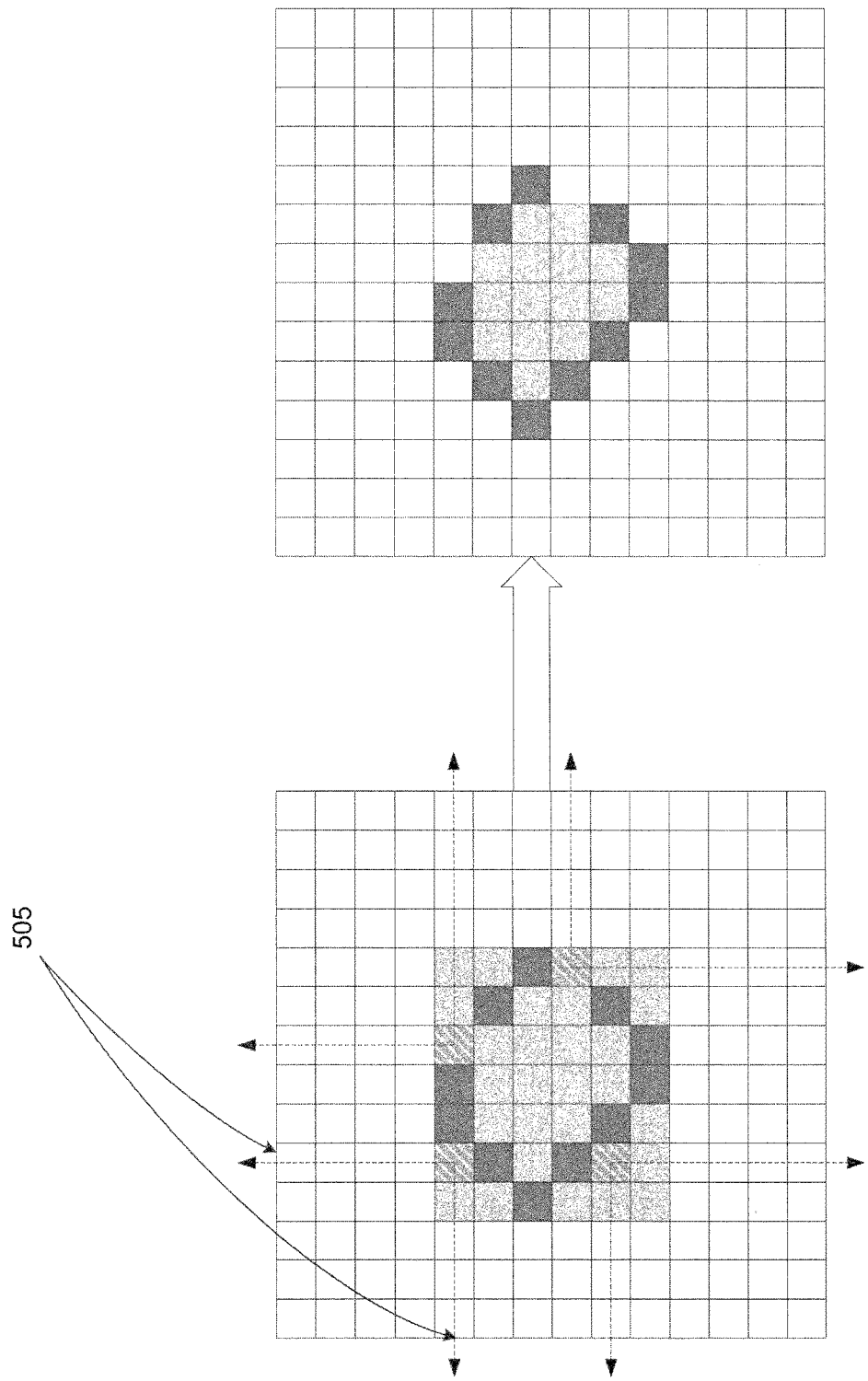
FIGS. 5B and 5C illustrates a false detection removal process for a single moving objection and multiple moving objects, respectively, according to an embodiment.
Figure 5C:
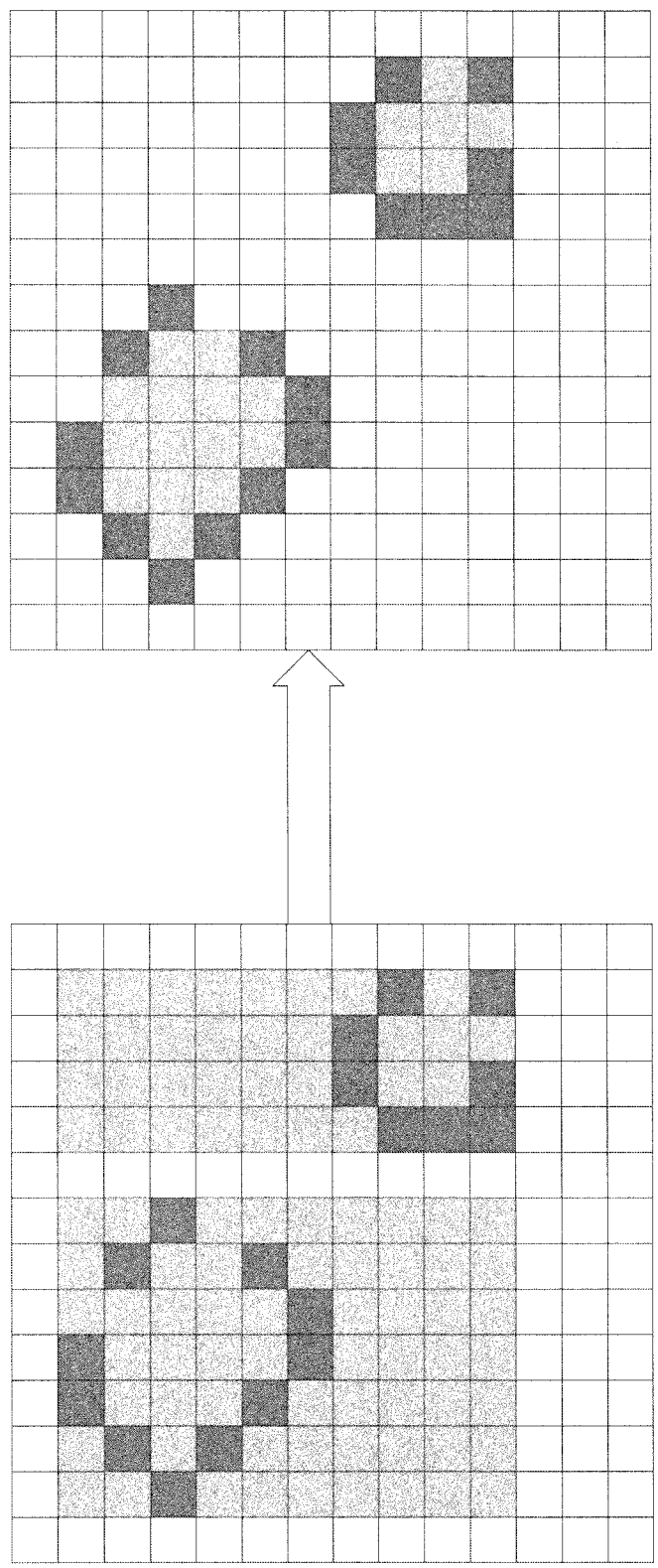

As shown in FIG. 5A the dark grey blocks 501 represent the blocks identified (step 406) as moving edge blocks based on the variance, for example, using equation 4. The densities of the moving edge blocks in the columns and rows are then used to identify those blocks which are surrounded by moving edge blocks. If the column density, x_density[j], times the row density, y_density[i], for a specific block satisfies an threshold, for example, is greater than zero, the block is identified as a moving block, light grey blocks 503 in FIG. 5A. This generates a rectangle of moving blocks around the moving edge blocks. Next, removal of the moving blocks which are outside of the moving edge blocks are removed by being marked as static blocks. As shown in FIG. 5B, each light grey block is checked to determined, if there exists a moving edge block between it and two adjacent frame borders 505. If no moving edge block exists, then the block is marked as a static block (see hashed light grey blocks in FIG. 5B). Dynamic programming may be used to lower the complexity of this process, such that the time and complexity are both O(number of blocks). FIG. 5C illustrates the removal process for a frame having two moving objects.

Because visual artifacts (e.g., motion trailing, blocking) can arise from the block-based temporal denoiser 214, especially when the filter strength is strong, the noise estimation 206 is employed to adapt the external denoising filter 214. In addition, the noise estimation may be used to adapt the moving object edge block detection 204 of the Moving object detector 210.

Referring to FIG. 6, the noise estimation process 331 may also use variance as a metric to distinguish high and low noise levels. According to an example embodiment, a noise value for each source frame may be calculated based on a sum of weighted variances M consecutive static blocks (step 601), for example, using equation 5 below. Static blocks may be determined using Equation (4) above for each source frame. When a block is consistently marked as static for a predefined number of frames, for example 6, it is marked as a consecutive static block. Also, the variance($s_t$, $p_{t-1}$), may be clipped to filter out very high values that are most likely due to the edges of the moving objects so that they do not skew the overall variance calculation. In addition, more weight is given to darker blocks. This is formula is as follows.

$$\text{noise value} = \frac{\sum_{i=0}^{M-1} \text{weight} * \text{variance}(s_{t,i}, p_{t-1,i})}{M}, \quad \text{Eq. (5)}$$

$$\text{where weight} = \frac{16}{\text{average luma of } s_{t,i}}$$

and M is the number of consecutive static blocks.

An average noise value is calculated (step 603) by temporally averaging on a fixed running window, for example 16 frames. Then the noise level for the current source frame is determined by comparing the average noise value to a predetermined noise threshold (step 605). Based on the results of the comparison, the noise level may be set using a binary value, e.g., low or high using the following algorithm:

noise level=average noise value>noise threshold?
high noise: low noise    (6)

where average noise value is a recursive average of noise value for 16 frames.

The variance threshold utilized by the moving object detection process 330 and the difference threshold utilized by the block-based temporal noise filtering process 323 may be adapted based on the noise level. According to an example embodiment, if the average noise level fails to satisfies a predefined noise threshold (no path out of step 604), then the a low variance threshold is utilized (step 607) in the moving object detection process 330 and a lower difference threshold is utilized (step 609) in the temporal noise filtering process 323. If the average noise level satisfies the predefined threshold (Yes path out of step 605), then a higher difference threshold is utilized (step 613) in the temporal noise filtering process 323 and a low variance threshold is utilized for center position blocks and a high variance threshold on border position blocks is utilized in the moving object detection process 330 (step 611). Center blocks are predefined based on the video conferencing application. For example, the center blocks may be predefined to cover the area where a human face is likely to be during a video conference.

Figure 7:
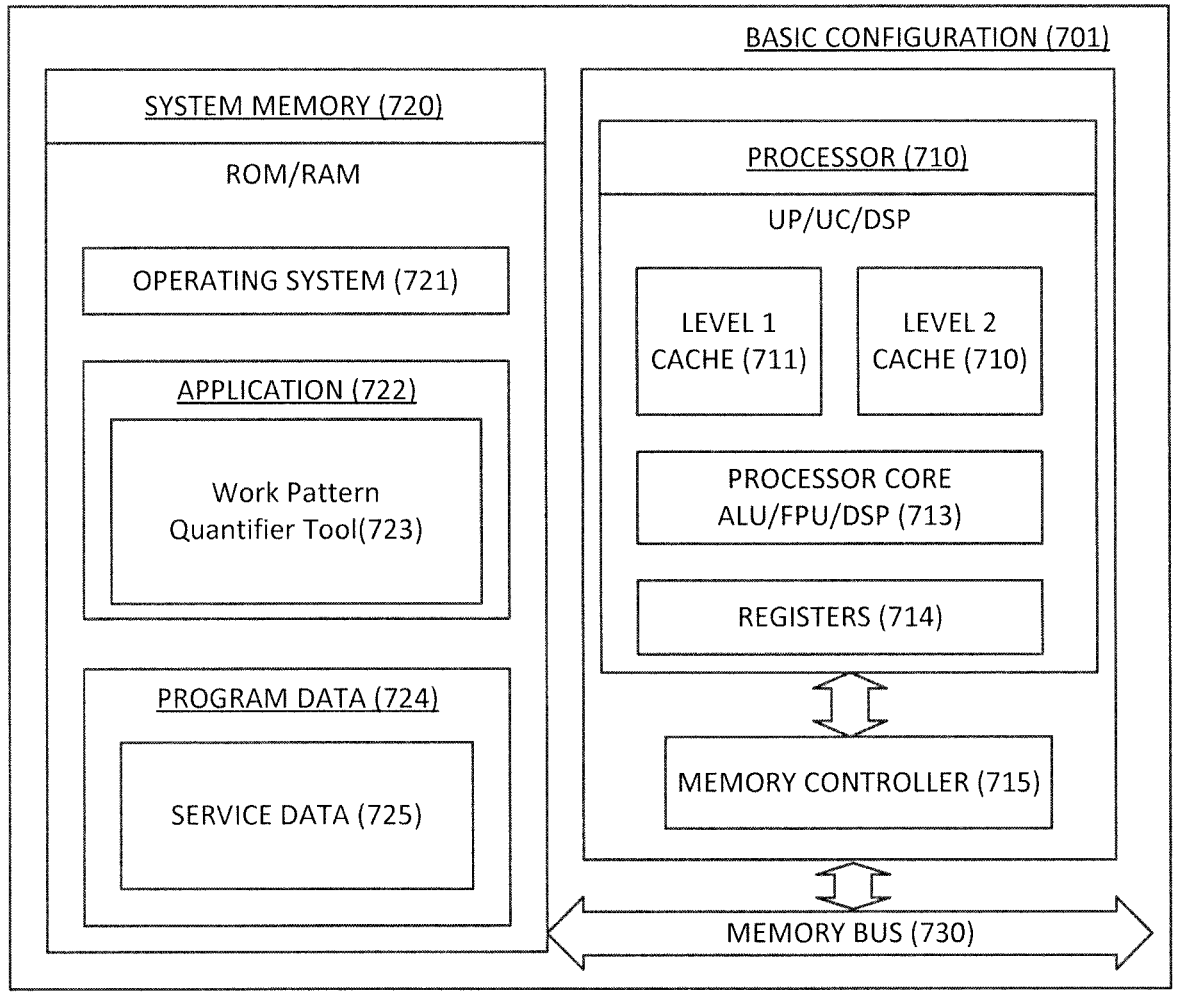
FIG. 7 is a block diagram illustrating an exemplary computing device.

FIG. 7 is a high-level block diagram of an exemplary computing device (700) that is arranged for providing adaptive denoising of source frames in a video conferencing application. In a very basic configuration (701), the computing device (700) typically includes one or more processors (710) and system memory (720). A memory bus (730) can be used for communicating between the processor (710) and the system memory (720).

Depending on the desired configuration, the processor (710) can be of any type including but not limited to a microprocessor (µP), a microcontroller (µC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (716) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more applications (722), and program data (724). The application (722) may include a video conferencing application and an adaptive denoising process for captured video. In some embodiments, the application (722) can be arranged to operate with program data (724) on an operating system (721).

The computing device (700) can have additional features or functionality, and additional interfaces to facilitate communications between the basic configuration (701) and any required devices and interfaces.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for adaptive noise filtering of source video prior to encoding in a video conferencing system, the method comprising:
   receiving source frames from a video capturing device;
   preprocessing the received source frames by removing noise from one or more blocks of a source frame by:
      dividing the source frame into a plurality of source blocks; and
      generating a preprocessed source frame by adaptively applying a block-based temporal denoising filter to the plurality of source blocks by, for each of the plurality of source blocks:
         determining whether an absolute difference between a sum of block pixels in a corresponding denoised block at time t−1 minus a sum of block pixels in a source block at time t satisfies a difference threshold;
         in response to determination that the difference threshold is satisfied, identifying the source block as moving;
         in response to determination that the difference threshold is not satisfied, identifying the source block as static;
         if the source block is identified as moving, copying the source block into the preprocessed frame; and
         if the source block is identified as static, copying a noise filtered version of the source block into the preprocessed frame;
   performing a noise level estimation for the source frames by:
      temporally averaging a calculated noise value on a fixed running window of a predetermined number of frames;
      determining, for a current frame, whether an average noise level satisfies a noise threshold; and
      in response to determining that the average noise level satisfies the noise threshold, setting a noise level as high;
   adapting the block-based temporal denoising filter based on the noise level estimation for the source frames by:
      in response to determining that the average noise level fails to satisfy the noise threshold, lowering a variance threshold for moving object detection and lowering a difference threshold for noise filtering; and
      in response to determining that the average noise level satisfies the noise threshold setting, increasing the difference threshold for noise filtering, lowering the variance threshold for center position blocks, and increasing the variance threshold on border position blocks;
   encoding the preprocessed source frames; and
   transmitting, over a network, the encoded frames to at least one endpoint.

2. The method of claim 1, wherein each block has N×N pixels, N being an integer.

3. The method of claim 2, wherein a greater number of the plurality of source blocks are processed by the block-based temporal denoising filter responsive to increasing the difference threshold.

4. The method of claim 1, wherein detection of whether the source block is determined by applying a variance-based moving object detection.

5. The method of claim 4, wherein the variance-based moving object detection comprises:
   for each of the plurality of source blocks,
      determining a variance between a corresponding noise filtered block at time t and a corresponding preprocessed source frame block at time t−1;
      if the variance satisfies the variance threshold then marking the source block as a moving object edge block;
      if the variance fails to satisfy the variance threshold, marking the source block as static; and
      identifying moving objects with the source frame by filling in moving object edge blocks.

6. The method of claim 5, wherein identifying the moving objects with the source frame comprises:
   deriving density values for rows and columns of the source frame by accumulating a number of moving blocks for each row and column in the source frame; and
   generating a rectangle of moving blocks around the source blocks previously marked as the moving object edge blocks.

7. The method of claim 6, further comprising:
   performing false object detection by, for each source block identified as moving, determining whether there exists at least one other block between the source block and two adjacent frame borders, wherein the at least one other block is identified as moving; and
   in response to determination that no block identified as moving exists between the source block and the two adjacent frame borders, marking the source block as static.

8. The method of claim 7, further comprising:
using dynamic programming to determine, for each source block marked as moving, whether there exists the at least one other block identified as moving.

9. The method of claim 1, wherein the noise level estimation is binary and uses a variance metric to distinguish high and low noise levels.

10. The method of claim 9, wherein the noise value is calculated using $$\text{noise value} = \frac{\sum_{i=0}^{M-1} \text{weight} * \text{variance}(s_{t,i}, p_{t-1,i})}{M},$$

$$\text{where weight} = \frac{16}{\text{average luma of } s_{t,i}}$$

and M is a number of consecutive static blocks.

11. The method of claim 1, wherein performing the noise level estimation for the source frames further includes, in response to determining that the average noise level fails to satisfy the noise threshold, setting the noise level as low.

12. The method of claim 1, wherein adapting the block-based temporal denoising filter based on the noise level estimation of the source frame comprises:
in response to a low noise level estimation for the source frame, noise filtering is decreased by lowering the difference threshold; and
in response to a high noise level estimation for the source frame, noise filtering is increased by increasing the difference threshold.

13. The method of claim 12, wherein adapting the block-based temporal denoising filter based on the estimate noise level of a source frame further comprises:
adapting the moving object detection based on noise level and block position.

14. A source device for adaptive noise filtering of source video prior to encoding in a video conferencing system, the source device comprising:
a video capture device that captures video source frames;
an external video noise filter, configured to:
receive source frames from the video capturing device;
preprocess the received source frames by removing noise from one or more blocks of a source frame by:
dividing the source frame into a plurality of source blocks; and
generating a preprocessed source frame by adaptively applying a block-based temporal denoising filter to the plurality of source blocks by, for each of the plurality of source blocks:
determining whether an absolute difference between a sum of block pixels in a corresponding denoised block at time t−1 minus a sum of block pixels in a source block at time t satisfies a difference threshold;
in response to determination that the difference threshold is satisfied identifying the source block as moving;
in response to determination that the difference threshold is not satisfied, identifying the source block as static;
if the source block is identified as moving, copying the source block into the preprocessed frame; and
if the source block is identified as static, copying a noise filtered version of the source block into the preprocessed frame;
performing a noise level estimation for the source frames, wherein the noise level estimation is binary and uses a variance threshold to distinguish high and low noise levels and wherein performing the noise level estimation comprises:
calculating a noise value using $$\text{noise value} = \frac{\sum_{i=0}^{M-1} \text{weight} * \text{variance}(s_{t,i}, p_{t-1,i})}{M},$$

$$\text{where weight} = \frac{16}{\text{average luma of } s_{t,i}}$$

and M is a number of consecutive static blocks;
temporally averaging a calculated noise value on a fixed running window of a predetermined number of frames;
determining, for a current frame, whether an average noise level satisfies a noise threshold; and
in response to determining that the average noise level fails to satisfy the noise threshold setting the noise level as high and otherwise setting the noise level as low; and
adapting the block-based temporal denoising filter based on the noise level estimation for the source frame;
a video codec configured to:
receive the preprocessed source frame; and
generate an encoded video bitstream, by encoding the preprocessed source frames; and
a processor configured to transmit, over a network, the encoded video bitstream to at least one endpoint.

15. The source device of claim 14, wherein removing noise from one or more blocks of a source frame comprises:
dividing the source frame into a plurality of blocks, each block having N×N pixels, N being an integer; and
generating a preprocessed source frame by adaptively applying a block-based temporal denoising filter to the plurality of source blocks, where a preprocessed source frame includes at least one filtered block and at least one source block.

16. The source device of claim 15, wherein a greater number of the source blocks are processed by the block-based temporal denoising filter responsive to increasing the difference threshold.

17. The source device of claim 15, wherein the external video noise filter is further configured to:
perform moving object detection to determine which the of the plurality of source blocks are moving blocks.

18. The source device of claim 17, wherein detection of whether the source block is moving is additionally determined by applying a variance-based moving object detection.

19. The source device of claim 18, wherein the variance-based moving object detection comprises:
for each of the plurality of source blocks,
determining a variance between a corresponding noise filtered block at time t and a corresponding preprocessed source frame block at time t−1;

if the variance satisfies the variance threshold then marking the source block as a moving object edge block;

if the variance fails to satisfy the variance threshold, marking the source block as static; and identifying moving objects with the source frame by filling in moving object edge blocks.

20. The source device of claim 19, wherein detecting the moving objects with the source frame comprises:

deriving density values for rows and columns of the source frame by accumulating a number of moving blocks for each row and column in the source frame; and generating a rectangle of moving blocks around the source blocks previously marked as the moving object edge blocks.

21. The source device of claim 20, the external video noise filter is further configured to:

perform false object detection by, for each source block identified as moving, determining whether there exists at least one other block between the source block and two adjacent frame borders, wherein the at least one other block is identified as moving; and in response to determination that no block identified as moving exists between the source block and the two adjacent frame borders, marking the source block as static.

22. The source device of claim 21, the external video noise filter is further configured to:

use dynamic programming to determine, for each source block marked as moving, whether there exists at least one other block identified as moving.

23. The source device of claim 15, the external video noise filter is further configured to:

adapt the block-based temporal denoising filter based on the estimate noise level of a source frame.

24. The source device of claim 23, wherein the noise level estimation is binary and uses a variance metric to distinguish high and low noise levels.

25. The source device of claim 14, wherein performing the noise level estimation for the source frames further includes in response to determining that the average noise level fails to satisfy the variance threshold, using a lower difference threshold for temporal noise filtering.

26. The source device of claim 14, wherein performing the noise level estimation for the source frames further includes in response to determining that the average noise level satisfies the variance threshold, using a higher difference threshold for temporal noise filtering, lowering the variance threshold for center position blocks, and increasing the variance threshold on border position blocks for moving object detection.

27. The source device of claim 14, wherein adapting the block-based temporal denoising filter based on the estimate noise level of a source frame comprises:

in response to a low noise level estimation for the source frame, noise filtering is decreased by lowering the difference threshold; and in response to a high noise level estimation for the source frame, noise filtering is increased by increasing the difference threshold.

28. The source device of claim 27, wherein adapting the block-based temporal denoising filter based on the estimate noise level of a source frame further comprises:

adapting the moving object detection based on noise level and block position.

29. The source device of claim 28, wherein adapting the moving object detection based on noise level and block position, comprises:

in response to a low noise level estimation for a source frame, lowering the variance threshold; and in response to a high noise level estimation for a source frame, lowering a variance threshold for blocks in the center of the source frame; and increasing the variance threshold for blocks on the source frame border.

* * * * *

UNITED STATES PATENT AND TRADEMARK OFFICE
CERTIFICATE OF CORRECTION

PATENT NO. : 10,511,846 B1
APPLICATION NO. : 15/254723
DATED : December 17, 2019
INVENTOR(S) : Chen et al.

It is certified that error appears in the above-identified patent and that said Letters Patent is hereby corrected as shown below:

On the Title Page

Item (71), under "Applicant," delete "GOOGLE INC." and insert -- GOOGLE LLC --, therefor.

Item (72), under "Inventors," delete "Manhattan Beach, CA (US)" and insert -- Austin, TX (US) --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*